United States Patent
Otani et al.

(10) Patent No.: US 7,732,724 B2
(45) Date of Patent: Jun. 8, 2010

(54) DETENT CHANGEOVER SWITCH APPARATUS

(75) Inventors: Kazuya Otani, Aichi (JP); Seiji Ishigaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 185 days.

(21) Appl. No.: 12/010,863

(22) Filed: Jan. 30, 2008

(65) Prior Publication Data

US 2008/0185272 A1    Aug. 7, 2008

(30) Foreign Application Priority Data

Feb. 2, 2007    (JP)    ............... P2007-024274

(51) Int. Cl.
*H01H 13/62*    (2006.01)
(52) U.S. Cl. .................................... 200/565
(58) Field of Classification Search .......... 200/565
See application file for complete search history.

(56) References Cited

U.S. PATENT DOCUMENTS

| 2007/0284233 A1* | 12/2007 | Ishigaki et al. | ............ 200/38 R |
| 2008/0190752 A1* | 8/2008 | Miyata et al. | ............... 200/565 |
| 2008/0197004 A1* | 8/2008 | Ishigaki et al. | .............. 200/336 |

FOREIGN PATENT DOCUMENTS

JP    2002-189559    7/2002

* cited by examiner

*Primary Examiner*—Michael A Friedhofer
*Assistant Examiner*—Lheiren Mae A Caroc
(74) *Attorney, Agent, or Firm*—Morgan, Lewis & Bockius LLP

(57) ABSTRACT

A detent crest member is integrally rotatably mounted on a dial knob. On the other hand, on a peripheral surface of a plunger mounting member which is rotatably operated using a motor, a plurality of plunger members which generates clicks in a dial knob together with the detent crest member is mounted. In changing over click feeling, the motor is rotated thus selectively bringing one of the plunger members mounted on the plunger mounting member into resilient contact with concave/convex patterns of the detent crest member which form the pair with one plunger member.

3 Claims, 13 Drawing Sheets

DETENT CHANGEOVER SWITCH APPARATUS

BACKGROUND OF THE INVENTION

The present invention relates to a detent changeover switch apparatus capable of changing over click feeling generated by an operation portion of an operation switch.

Conventionally, as an input operation system for performing operation setting of various vehicle-loaded equipment such as an air conditioner and an audio device, various kinds of operation switches are mounted on a vehicle corresponding to respective functions. As one example, with respect to the operation switches of the air conditioner, for example, a temperature setting switch for setting a supply-air temperature, an air volume setting switch for setting an air volume, an air blow direction setting switch for setting an air blow and the like are used. As such a group of switches, a rotary operation switch, that is, a rotary switch which performs setting of various functions by rotatably operating a dial knob of a rotary operation type as an operation portion has been popularly used.

Further, this kind of rotary switch is provided with a detent mechanism capable of imparting a desired operation force or click feeling to the dial knob as a click for ensuring an operation of the dial knob by enhancing operation feeling of the dial knob. In general, the detent mechanism is configured such that the detent mechanism includes the dial knob rotatably operated by an operator and a casing which rotatably supports the dial knob, a plurality of detent crests which is arranged between the dial knob and the casing and is formed on one of the dial knob and the casing along the rotational direction of the knob, a detent piece which is always biased to the detent crest due to a biasing spring is mounted on the other of the dial knob and the casing, and operational force which is generated when the detent piece gets over the detent crest due to the rotational operation of the dial knob is imparted to the operator as click feeling.

Recently, to realize the reduction of the number of parts of the operation switch, there has been an attempt to use one rotary switch in common among a plurality of selection functions. In this kind of operation switch having the common use structure, a switch controller which constitutes a control unit of the input operation system brings a switch determination mode into a function selection setting mode in a switch determination initial state. At this point of time, when the dial knob is operated, in response to a switch signal acquired from the rotary switch, a vehicle-loaded equipment which the operator requires setting a function thereof is selected and designated. The switch controller, after the selection and the designation of the vehicle-loaded equipment, changes over the switch determination mode to a detail setting mode. When the dial knob is operated at this point of time, in response to a switch signal acquired from the rotary switch, the detail of the selected and designated vehicle-loaded equipment is set to a state corresponding to the switch operation.

In case of the operation switch having the common-use structure, it is desirable that the click feeling generated in the rotary switch by the detent mechanism differs for every selection function. Here, a detent changeover technique which changes over click feelings for respective selection functions using this type of operation switch having the common-use structure is disclosed in JP-A-2002-189559, for example. In the technique disclosed in JP-A-2002-189559, a plurality of discs having detent crests which differ from each other in the arrangement distance is arranged side by side in the vertical direction, and by vertically moving a detent piece by an actuator, the detent piece is selectively brought into resilient contact with detent crests of one of these discs thus changing over the click feeling acquired when a dial knob is rotatably operated.

In the technique disclosed in patent document 1, one rotary switch is used in common among the plurality of selection functions, and the click feeling generated in the dial knob can be changed over for respective selection functions. However, the technique disclosed in JP-A-2002-189559 adopts the structure which vertically moves the detent piece per se by the actuator over a plurality of discs and hence, the technique adopts the part arrangement structure in which a plurality of discs having the detent crests are arranged side by side along the direction of an operation shaft of the dial knob. Accordingly, although the operation switch described in JP-A-2002-189559 can change over the click feeling of the dial knob, the number of parts necessary for the rotary switch is increased thus giving rise to a possibility that the switch apparatus becomes large sized or a device cost is pushed up whereby there has been a demand for the reduction of the number of parts of this kind.

SUMMARY OF THE INVENTION

It is an object of the present invention to provide a detent changeover switch apparatus which can change over click feeling generated by one operation switch with the small number of parts even when click feeling of an operation portion can be changed over in multiple stages.

To solve the problem, the present invention provides the following arrangements.

(1) A detent changeover switch apparatus for performing a selection function operation, comprising:
  an operation switch that includes an operation portion to be operated by an operator and a fixed portion;
  a plurality of detent mechanisms, wherein each of the detent mechanisms includes a detent crest member that has a concave/convex pattern along an operating direction of the operation portion and is formed on one of the operation portion and the fixed portion, and a plunger member that includes a biasing member and a piece member resiliently brought into contact with the concave/convex pattern by the biasing member and is formed on the other of the operation portion and the fixed portion; and
  a detent changeover mechanism that includes an actuator for bringing the piece member of the plunger member of one of the detent mechanisms into resilient contact with the corresponding concave/convex pattern to allow the operation portion to generate click feeling when the piece member gets over a projection portion of the concave/convex pattern at the time of operating the operation portion,
  whereby the detent changeover mechanism changes over click feeling of the operation portion by selecting one of the detent mechanism and bringing the selected detent mechanism into an operation state.

(2) The detent changeover switch apparatus according to (1), wherein the detent changeover mechanism includes:
  a rotary actuator that includes a drive shaft;
  a support member that is mounted on the drive shaft and mounts the plunger members of the detent mechanisms in a state that the plunger members are arranged in an axial direction of the drive shaft and are displaced in a circumferential direction of the drive shaft,
  a detector that detects an operation state when the operator operates the operation portion, and a controller that performs a drive control of the rotary actuator based on a detection quantity of the detector to bring the plunger member of the selected detent mechanism into resilient contact with the corresponding concave/convex pattern.

(3) The detent changeover switch apparatus according to (2), wherein the operation portion is of a rotary operation type in which the operation direction assumes a rotary direction, among the detent mechanisms, the concave/convex patterns generate click feelings different from each other, respectively, the concave/convex patterns are formed on a bottom surface of the detent crest member so that the concave/convex patterns are arranged side by side along a radial direction of the detent crest member, and the rotary actuator is arranged in an orthogonal direction in which the drive shaft intersects an operation shaft of the operation portion, and the plunger members are selectively brought into resilient contact with the corresponding concave/convex pattern from a bottom surface side.

With this an arrangement, in the detent changeover mechanism, by bringing one of the plurality of existing plunger members into resilient contact with the concave/convex pattern which forms the pair with such one plunger member, one detent mechanism among the plurality of detent mechanisms is selectively specified and brought into an operation state so that the click feeling generated in the operation portion can be changed over. For example, when the plunger member capable of generating strong click and the concave/convex pattern which forms the pair with the plunger member are brought into resilient contact with each other, the detent mechanism brings about a state in which the detent mechanism for generating strong click functions so that when the operation portion is operated, the strong click feeling is generated in the operation portion. On the other hand, when the plunger member capable of generating weak click and the concave/convex pattern which forms the pair with the plunger member are brought into resilient contact with each other, the detent mechanism brings about a state in which the detent mechanism for generating weak click functions so that when the operation portion is operated, the weak click feeling is generated in the operation portion.

This arrangement adopts the structure in which, in incorporating the detent changeover mechanism for changing over the click feeling of the operation portion into the operation switch apparatus, the plurality of concave/convex patterns necessary in such a case is formed on one detent crest member, and one concave/convex pattern is selected out of the concave/convex patterns as the concave/convex pattern used for each case. Accordingly, assuming a case in which the detent crest member is provided for every concave/convex pattern, the number of parts is increased correspondingly thus giving rise to a possibility that the operation switch apparatus becomes large-sized, a parts cost is increased or the like. However, by mounting the plurality of concave/convex patterns on one detent crest member as in the case of this arrangement, it is unnecessary to prepare the detent crest member for every concave/convex pattern and hence, there is substantially no possibility that the operation switch apparatus becomes large-sized or a parts cost is increased.

With this arrangement, for example, when a linear actuator which reciprocally and linearly moves the drive shaft is used as the drive source of the detent changeover mechanism, it is necessary to provide a moving space for the drive shaft in the inside of the operation switch apparatus thus giving rise to a possibility that the device becomes large-sized correspondingly. However, using the rotary actuator as the drive source of the detent changeover mechanism as in the case of this arrangement, this kind of motor is rotated at the own position and hence, a small space is required as the arrangement space thus substantially eliminating the possibility that the device becomes large-sized.

With this arrangement, the plurality of concave/convex patterns present for generating the click feelings which differs from each other is formed in a state that the plurality of concave/convex patterns is arranged side by side in the radial direction with respect to the detent crest member performing the rotary movement along with the operation of the operation portion. Accordingly, the part size of the detent crest member can be decreased in the direction of the operation axis of the operation portion and hence, the device size of the operation switch apparatus in the direction of the operation axis can be decreased.

According to the present invention, even when the click feeling of the operation portion can be changed over in multiple stages, the click feeling generated by one operation switch can be changed over with the small number of parts.

DETAILED DESCRIPTION OF PREFERRED EMBODIMENTS

First Embodiment

A first embodiment of a detent changeover switch apparatus which embodies the present invention is explained in conjunction with FIG. 1 to FIG. 9 hereinafter.

Figure 1:
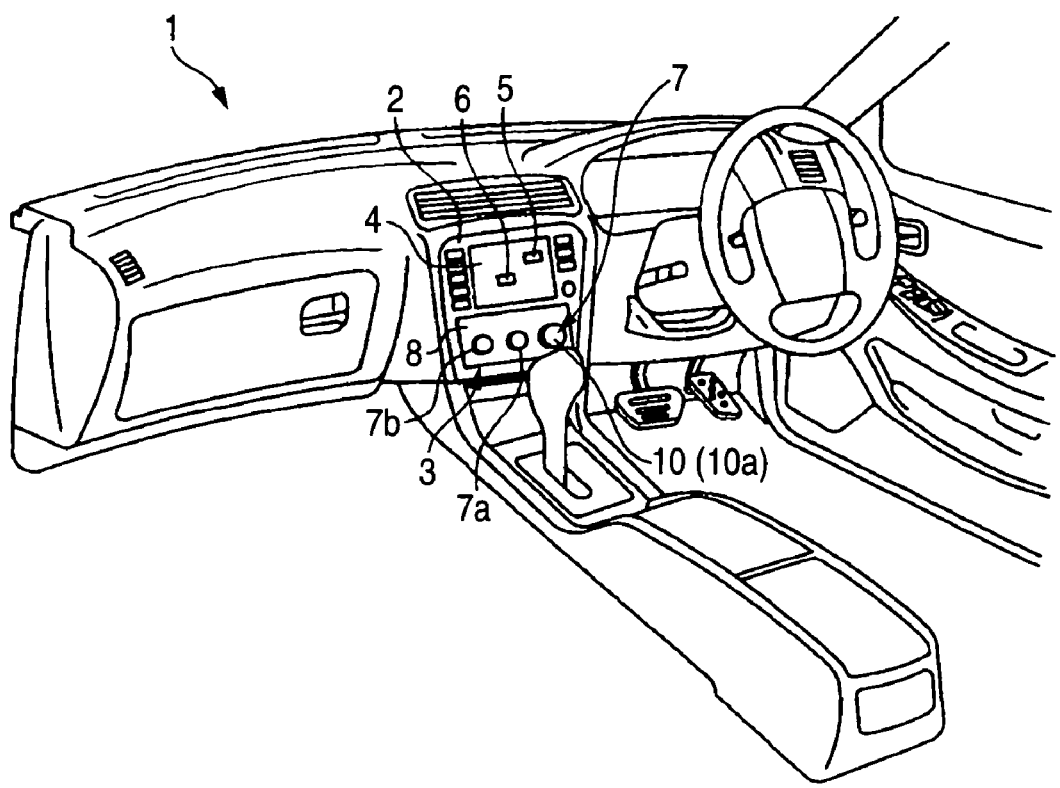
FIG. 1 is a perspective view of the interior of a vehicle according to a first embodiment.

As shown in FIG. 1, on a center cluster 2 of a vehicle 1, an operation switch apparatus 3 is mounted as an operation system of various vehicle loaded equipment such as an air conditioner, an audio device and a car navigation device. The operation switch 3 of this embodiment uses a graphical user interface (GUI) for enhancing visibility and operability at the time of performing a button selection operation. The graphical-user-interface-type operation switch apparatus 3 performs a graphic display of item buttons 5, icons 6 and the like on a display 4 mounted on the center cluster 2 and, while selectively designating the item buttons 5, the icons 6 or the like on the display 4 using an operation switch 7 mounted on the same center cluster 2, performs an input operation using a decision switch 7a and a return switch 7b arranged close to the operation switch 7.

Figure 3:
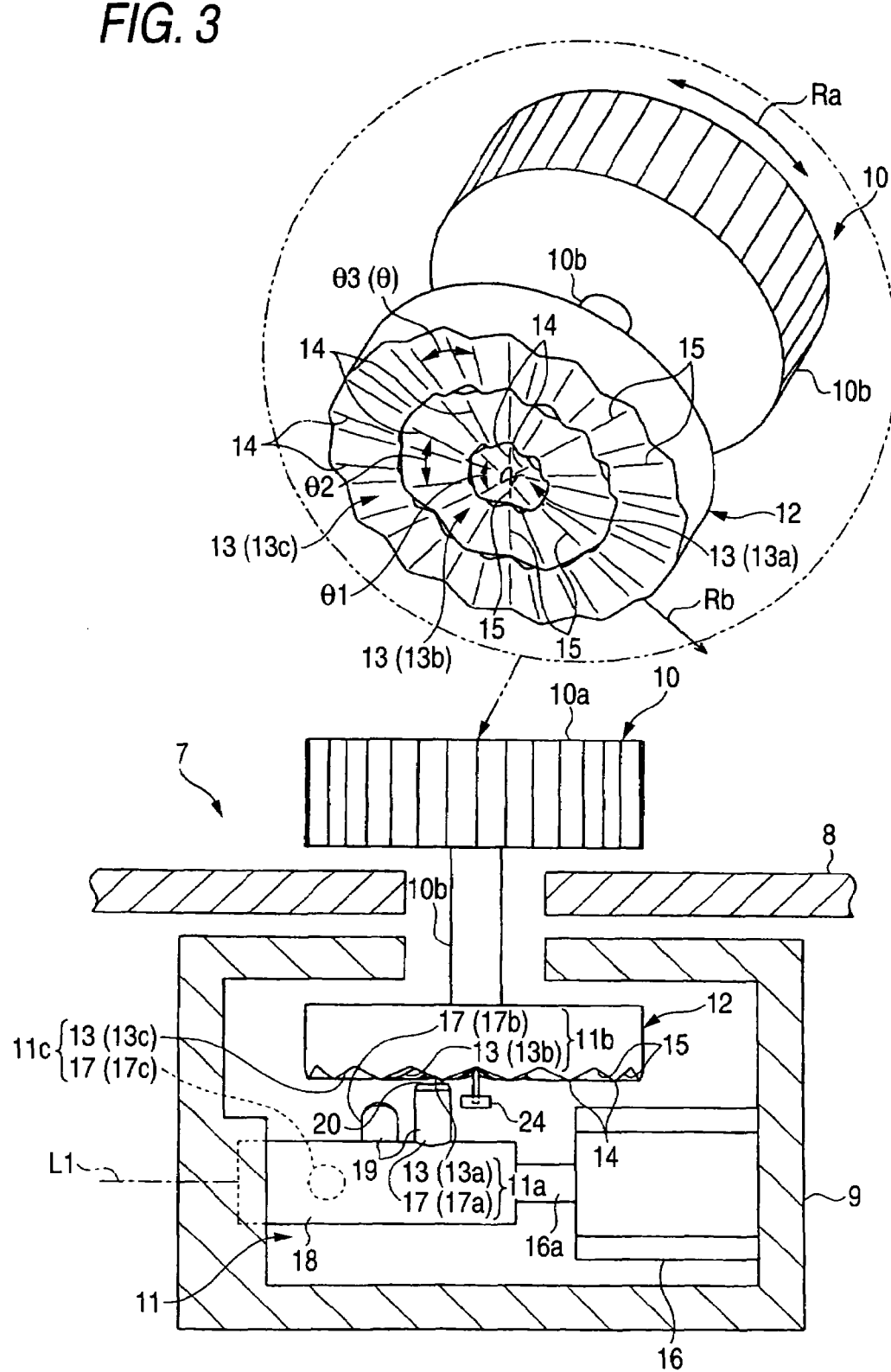
FIG. 3 is a longitudinal cross-sectional view showing the internal arrangement of on operation switch having a detent changeover mechanism.

As shown in FIG. 3, on an inner side of a cluster panel 8 of the center cluster 2, a switch casing 9 which houses various kinds of switching parts such as the operation switch 7 are fixedly mounted. When the operation switch 7 is of a dial operation type, on the switch casing 9, a dial knob 10 forming an operating portion at the time of performing the switching operation is mounted in a rotatably operable manner. The dial knob 10 includes an approximately cylindrical knob portion 10a which forms a gripping portion at the time of performing the switching operation, and an operation shaft 10b which integrally extends from a bottom surface of the knob portion 10a in the vertical direction from the same axial position. Here, the dial knob 10 corresponds to an operating portion.

In the inside of the switch casing 9, a detent changeover mechanism 11 which can change over click feeling generated by the dial knob 10 when the dial knob 10 is rotatably operated in multiple stages is arranged. To explain this detent changeover mechanism 11 hereinafter, an approximately disc-shaped detent crest member 12 is fixedly mounted on a lower end of the operation shaft 10b of the dial knob 10 in a state that the detent crest member 12 becomes coaxial with the knob portion 10a. On a bottom surface of the detent crest member 12, a concave/convex pattern 13 is formed along the rotary operation direction (the direction indicated by an arrow Ra in FIG. 3) of the dial knob 10. The concave/convex pattern 13 adopts a shape pattern in which a plurality of detent crests 14 and a plurality of detent valleys 15 are alternately arranged along the rotary operation direction of the dial knob 10. Here, the detent crests 14 correspond to projecting portions.

A plurality of concave/convex patterns 13 is formed along the radial direction (the direction indicated by an arrow Rb in FIG. 3) of the detent crest member 12, and these concave/convex patterns 13 respectively have intervals of the detent crests 14 which differ from each other, that is, detent crest arrangement distances θ between the neighboring detent crests in the rotary operation direction differ from each other. In this embodiment, three concave/convex patterns 13a to 13c are formed on the detent crest member 12. Here, the detent crest arrangement distance θ of the concave/convex pattern 13a positioned at an end portion in the radial direction of the detent crest member 12 is set to a minimum value θ1, the detent crest arrangement distance θ of the concave/convex pattern 13b positioned at a middle portion in the radial direction is set to an intermediate value θ2, and the detent crest arrangement distance θ of the concave/convex pattern 13c positioned at an innermost portion in the radial direction of the detent crest member 12 is set to a maximum value θ3.

In the inside of the switch casing 9, a motor 16 such as a DC motor which constitutes a drive source of the multi-stage detent changeover mechanism 11 is housed, for example. A plunger mounting member 18 is mounted on a drive shaft 16a of the motor 16, and a plurality of plunger members 17 which imparts click feelings to the dial knob 10 in a cooperative manner with the detent crest member 12 is mounted on the plunger mounting member 18. The plunger mounting member 18 is formed in an elongated fine cylindrical shape, for example, and is mounted on the motor 16 in a state that a proximal end of the plunger mounting member 18 is fixedly secured to a drive shaft 16a of the motor 16. When the motor 16 is driven, the motor 16 is rotatable about an axis L1 thereof. Here, the motor 16 constitutes an actuator or a rotary actuator, while the plunger mounting member 18 corresponds to a support member.

Each plunger member 17 forms a pair with one of the respective concave/convex patterns 13 . . . , and corresponding to the rotary position of the motor 16, one of these plunger members 17a to 17c is selectively engaged with the concave/convex pattern 13a, 13b, 13c which forms the pair with the above-mentioned one plunger member. The plunger members 17a to 17c are mounted on an outer periphery of the plunger mounting member 18 and, at the same time, in this embodiment, are displaced along the direction of the axis L1 of the plunger mounting member 18, and are also displaced about the axis L1. In this embodiment, the plunger member 17a positioned on a side closest to the motor forms the pair with the concave/convex pattern 13a (first-stage detent mechanism 11a), the plunger member 17b positioned next closest to the motor forms the pair with the concave/convex pattern 13b (second-stage detent mechanism 11b) and the plunger member 17c positioned most distal end side forms the pair with the concave/convex pattern 13c (third-stage detent mechanism 11c).

Figure 2:
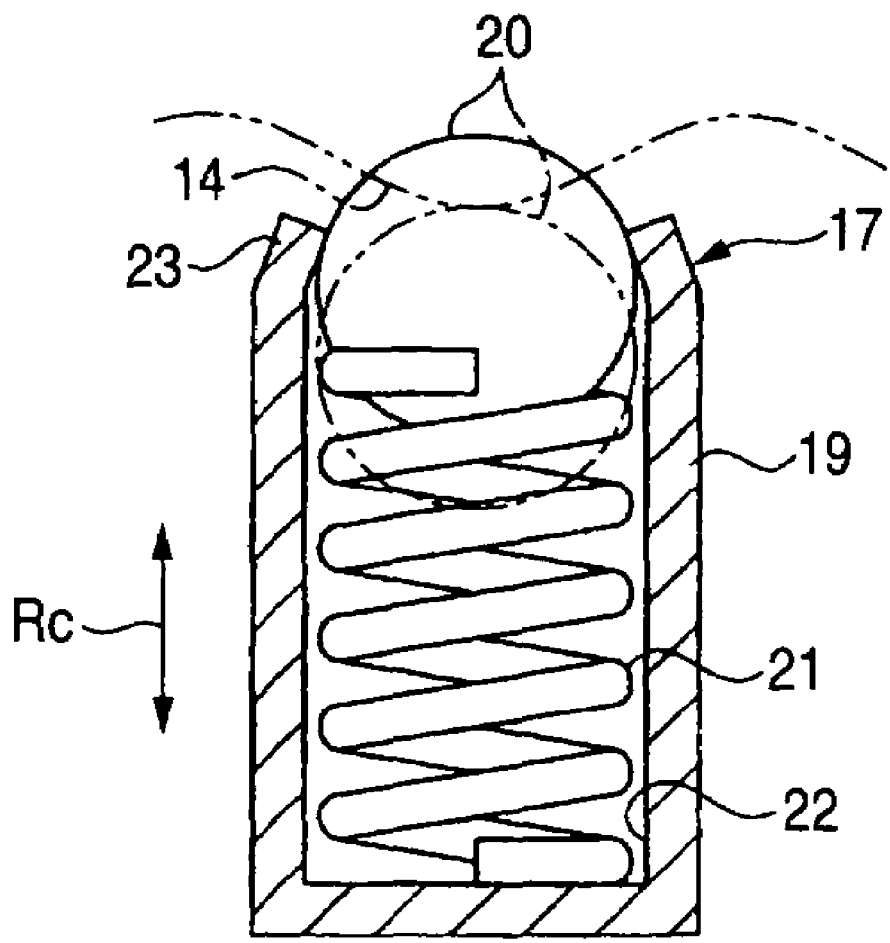
FIG. 2 is a longitudinal cross-sectional view showing the schematic arrangement of a plunger member.

As shown in FIG. 2 and FIG. 3, each plunger member 17, 17 . . . includes an approximately rectangular parallelepiped plunger casing 19, and the plunger member 17 is mounted on the plunger mounting member 18 in a state that the plunger casing 19 is fixedly secured to an outer periphery of the plunger mounting member 18. In the plunger casing 19, a detent piece 20 formed in a spherical shape, for example, is mounted in a state that the detent piece 20 is always brought into resilient contact with the concave/convex pattern 13 due to a biasing member 21 formed of a coil spring or the like (see FIG. 2) and, at the same time, the detent piece 20 is relatively movable in the biasing direction (the direction indicated by an arrow Rc in FIG. 2) of the biasing member 21. Further, diameters of detent pieces 20 of the respective plunger members 17a to 17c are set corresponding to depths of the detent valleys 15 of the respective corresponding concave/convex patterns 13a to 13c. Here, the detent piece 20 corresponds to a piece member.

As shown in FIG. 2, a housing portion 22 which opens on the concave/convex pattern 13 side of the detent crest member 12 is formed in the plunger casing 19 in a recessed manner, and the detent piece 20 is housed in the housing portion 22 in a relatively movable manner. Further, the biasing member 21 is also housed in the housing portion 22, wherein one end of the biasing member 21 is brought into contact with the detent piece 20, and the other end of the biasing member 21 is brought into contact with a bottom surface of the housing portion 22. On a portion of the housing portion 22 around the opening, a removal preventing portion 23 which prevents the removal of the detent piece 20 is formed by projecting at least a portion of a periphery of the opening. The detent piece 20 is linearly reciprocal in the inside of the housing portion 22. In this embodiment, when the detent piece 20 is brought into resilient contact with the concave/convex pattern 13 which forms the pair with the detent piece 20, the detent piece 20 is movable along an operation shaft direction of the dial knob 10.

Figure 4:
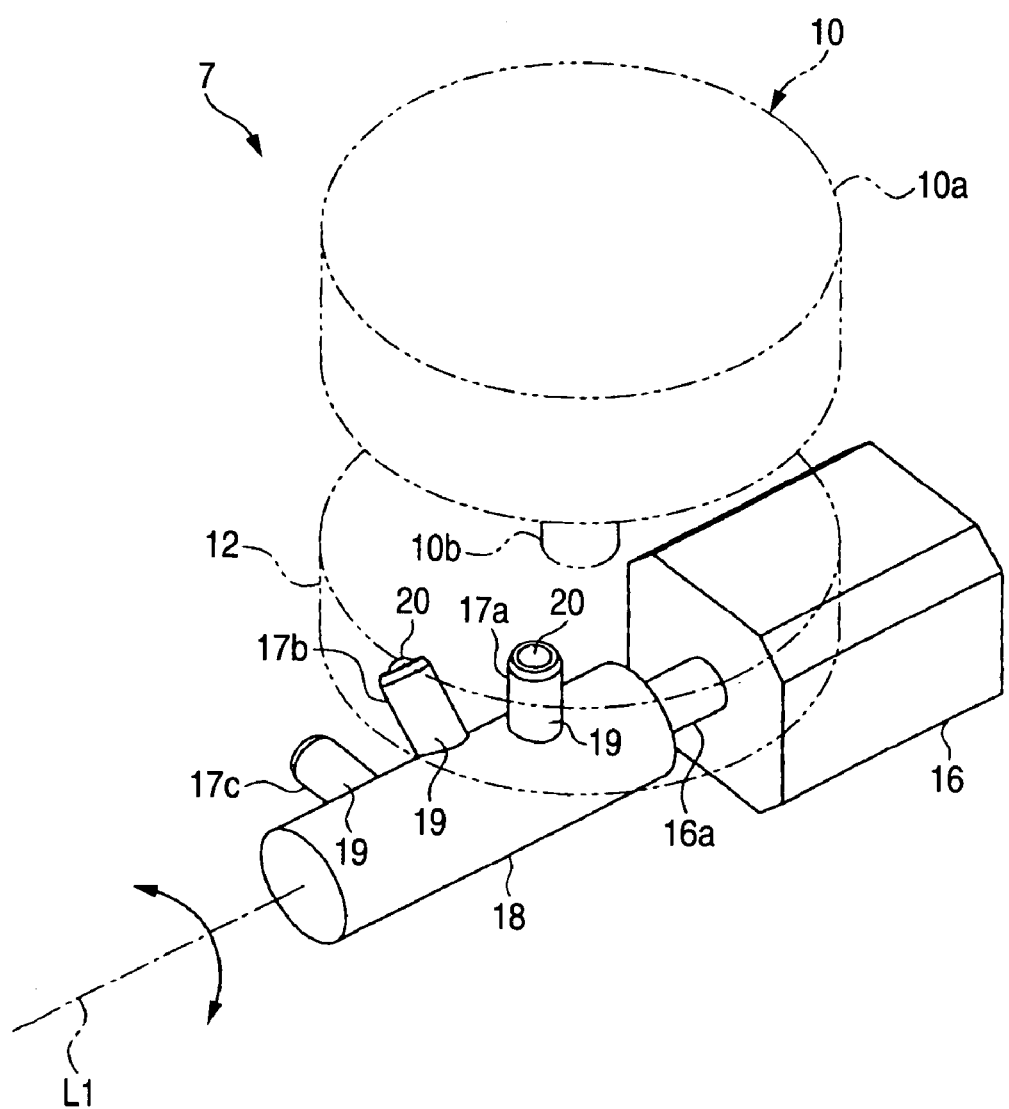
FIG. 4 is an operation explanatory view for explaining an operation of the detent changeover mechanism.

In the detent changeover mechanism 11, when the plunger mounting member 18 takes a small click feeling generating rotary position shown in FIG. 4 due to a rotary operation of the motor 16, the first plunger member 17a is brought into resilient contact with the first concave/convex pattern 13a thus allowing the first-stage detent mechanism 11a to function. Further, in the detent changeover mechanism 11, when the plunger mounting member 18 takes an intermediate click feeling generating rotary position shown in FIG. 5 due to the rotary operation of the motor 16, the second plunger member 17b is brought into resilient contact with the second concave/convex pattern 13b thus allowing the second-stage detent mechanism 11b to function. In the detent changeover mechanism 11, when the plunger mounting member 18 takes a large click feeling generating rotary position shown in FIG. 6 due to the rotary operation of the motor 16, the third plunger member 17c is brought into resilient contact with the third concave/convex pattern 13c thus allowing the third-stage detent mechanism 11c to function.

When the dial knob 10 is rotatably operated, the detent crest member 12 is rotated together with the rotary movement of the dial knob 10 thus bringing about a state in which the detent crest member 12 is rotatably moved relative to the plunger member 17 positioned on a casing side. Here, the detent piece 20 of the plunger member 17 takes the movement such that, as indicated by a chain double-dashed line shown in FIG. 2, the detent piece 20 gets over the detent crest 14 of the detent crest member 12 against a biasing force of the biasing member 21, and a resistance force which is generated each time the detent piece 20 gets over the detent crest 14 is generated as click feeling of the dial knob 10. Here, the generated click feeling of the detent changeover mechanism 11 is determined based on various factors such as a height and distance of the detent crests 14, a size of the detent piece 20 and the biasing force of the biasing member 21.

Here, the changeover of the click generated by the dial knob 10 of this embodiment includes, in a broad meaning, the changeover of click feeling generated by the dial knob 10 when the dial knob 10 is rotatably operated, and the changeover of a strength of click corresponding to an operation weight when the dial knob 10 is rotatably operated. That is, the description that the click is increased implies that the click feeling or the click intensity is increased, and the description that the click is decreased implies that the click feeling or the click intensity is decreased. Further, the distance between the detent crests 14 positioned close to each other is mainly relevant to the click feeling changeover, while the height of the detent crests 14, the size of the detent piece 20 and the biasing force of the biasing member 21 are mainly relevant to the click strength changeover.

The detent mechanisms 11a to 11c of this embodiment are configured such that the first-stage detent mechanism generates the small click feeling and, are set such that the total number of clicks per one rotation is increased. In the ascending order from the first stage to the third stage, that is, as shown in FIG. 3, the respective detent mechanisms 11a to 11c are configured such that the respective detent crest arrangement distance θ is in the descending order of the first stage→ the second stage→ the third stage and hence, the number of generated click is sequentially increased in the ascending order from the first stage to the third stage. Further, the sizes of the detent pieces 20 of the detent mechanisms 11a to 11c are set in conformity with the detent crest arrangement distances θ of the respective detent mechanisms 11a to 11c such that the detent piece 20 of the first-stage detent mechanism 11a has the largest piece diameter, the detent piece 20 of the second-stage detent mechanism 11b has a piece diameter smaller than the largest piece diameter, and the detent piece 20 of the third-stage detent mechanism 11c has the smallest piece diameter.

As shown in FIG. 3, on a lower end of the operation shaft 10b of the dial knob 10, an encoder 24 for detecting a rotary quantity (rotational speed) of the dial knob 10 is mounted. The encoder 24 is constituted of a pulse encoder which outputs a rotation detection output value as pulse signals, for example. In detecting the rotation of the dial knob 10, the encoder 24 is capable of outputting a detection signal of the number of pulses corresponding to the rotational quantity of the dial knob 10 at the point of time. Here, the decision switch 7a, the return switch 7b and the encoder 24 constitutes a detection means.

Figure 7:
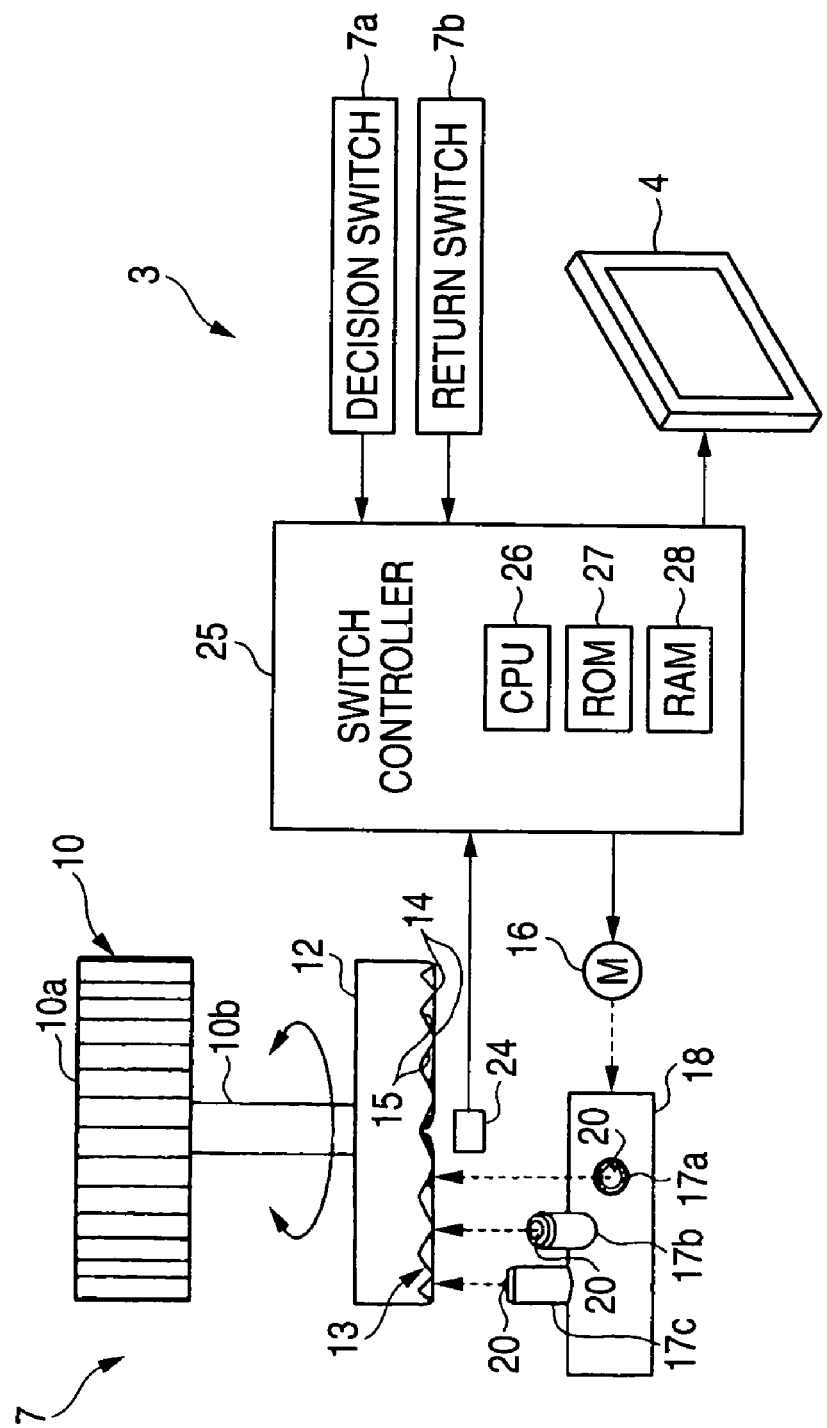
FIG. 7 is a schematic arrangemental view showing the device arrangement of an operation switch apparatus.

As shown in FIG. 7, the operation switch apparatus 3 includes a switch controller 25 as a control unit for the operation switch apparatus 3. The switch controller 25 includes a CPU 26 for systematically controlling the switch controller 25, a ROM 27 for storing various programs and data groups, a RAM 28 used as an operational region at the time of performing a program operation and the like, and is operated in accordance with a control program in the inside of the ROM 27. The switch controller 25 is connected to the encoder 24 through electric wiring. The switch controller 25 calculates a rotational operation quantity of the dial knob 10 using the detection signal acquired from the encoder 24, and supplies the operation quantity information to other control units which require such a rotational operation quantity or performs a display control of a display screen of the display 4.

The switch controller 25 performs a changeover control of click feeling generated by the dial knob 10 such that the switch controller 25 controls a rotational position of the motor 16 based on the various operations which an operator performs at the time of operating the dial knob 10 thus bringing the specific detent mechanism into a drive state out of the plurality of existing detent mechanisms 11a to 11c. For example, the switch controller 25, upon recognition of a state that the display screen of the display 4 or the rotational operation position of the dial knob 10 assumes a state which allows the dial knob 10 to generate small click feeling, rotates the motor 16 so as to bring the first plunger member 17a into resilient contact with the first concave/convex pattern 13a thus allowing the first stage detent mechanism 11a to function. On the other hand, upon recognition of a state that the display screen of the display 4 or the rotational operation position of the dial knob 10 assumes a state which allows the dial knob 10 to generate large click feeling, rotates the motor 16 in the direction opposite to the above-mentioned direction so as to bring the third plunger member 17c into resilient contact with the third concave/convex pattern 13c thus allowing the third stage detent mechanism 11c to function. Here, the switch controller 25 corresponds to a control means.

Next, the manner of operation of the operation switch apparatus 3 of this embodiment is explained.

Figure 8:
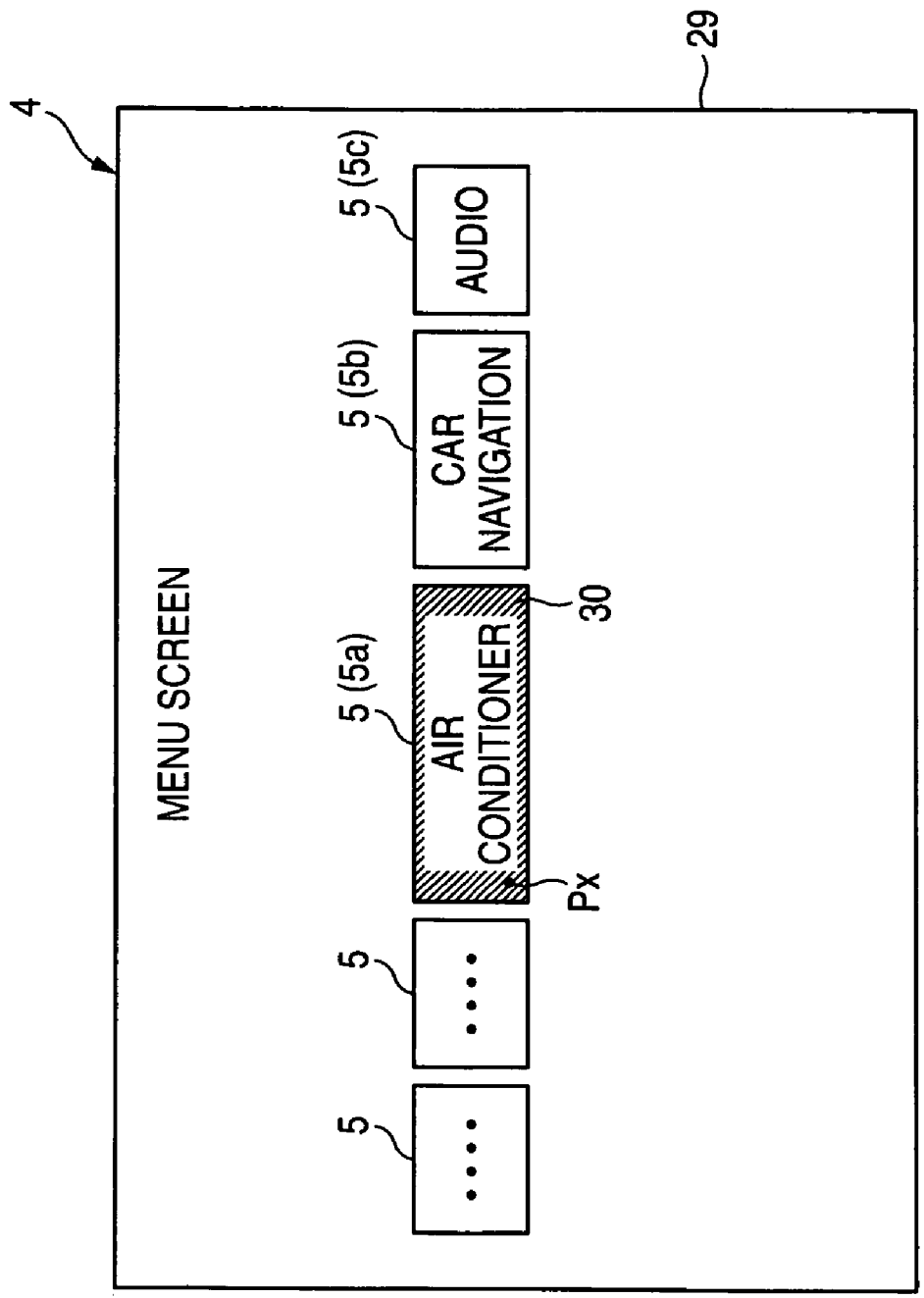
FIG. 8 is a screen view showing a menu screen displayed on a display.

When an ignition switch (not shown in the drawing) of the vehicle 1 is operated to assume an ACC position or an IG position, the switch controller 25 assumes a start state and sets an operation mode thereof to an item button selection mode, displays a menu screen 29 shown in FIG. 8 as an initial operation screen on the display 4, and recognizes the operation switch 7 as an item button selection switch. On the menu screen 29, a plurality of item buttons 5, 5 . . . which is selectively designated at the time of setting functions of various vehicle equipment mounted on the vehicle 1 is displayed in an allocated manner. As the item buttons 5, 5 . . . displayed on the menu screen 29, for example, an air conditioner function setting button 5a selected for setting the various functions of the air conditioner, a car navigation button 5b selected for setting various functions of the car navigation device, an audio button 5c selected for setting various functions of the audio device and the like are provided.

Here, in selecting and designating the item button 5 on the menu screen 29, a selection coordinate position Px on the display 4 is moved by the dial knob 10 so as to position the button focus 30 on the desired item button 5 and, after such positioning, the decision switch 7a (see FIG. 1 and FIG. 7) mounted on the center cluster 2 is operated by pushing. When the switch controller 25 recognizes the selected operation of the decision switch 7a, the switch controller 25 recognizes the item button 5 positioned at the selection coordinate position Px immediately before the decision switch 7a is operated as an operation demand button, and various processing corresponding to functions which the operation demand button possesses are performed with respect to the vehicle 1.

Here, in the operation switch apparatus 3 of this embodiment which uses one operation switch 7 in common among a plurality of selection functions, the total number of objects to be selected, the total number of items to be selected or the like differs among the respective selection functions (including the display screen and the knob rotary operation position) and hence, it is preferable to cope with such a situation by changing the generated click feeling of the dial knob 10 corresponding to the respective selection functions. Accordingly, the operation switch 7 of this embodiment includes the detent mechanisms 11a to 11c capable of generating click feelings in the dial knob 10. In this type of detent mechanisms 11a, 11b, 11c, contact feeling which is generated when the detent piece 20 gets over one detent crest 14 in the rotational operation of the dial knob 10 generates operation feeling corresponding to one click feeling and hence, this embodiment copes with the above-mentioned situation by changing over this click feeling.

Accordingly, when the number of item buttons 5 displayed on the menu screen 29 is small, by setting the click generated by the dial knob 10 to small click feeling, it is possible to cope with the situation by making the number of item buttons when the small number of buttons is displayed and the number of clicks generated by the dial knob 10 correspond to each other. Here, the switching controller 25, for allowing the dial knob 10 to generate small click feeling, as shown in FIG. 4, rotates the motor 16 so as to allow the plunger mounting member 18 to assume the small click feeling generating rotary position thus bringing the first plunger member 17a into resilient contact with the first concave/convex pattern 13a. Accordingly, among the detent mechanisms 11a to 11c, the first-stage detent mechanism 11a is allowed to function and hence, the click feeling of the first stage detent mechanism 11a which is the small click feeling is generated by the dial knob 10.

Figure 5:
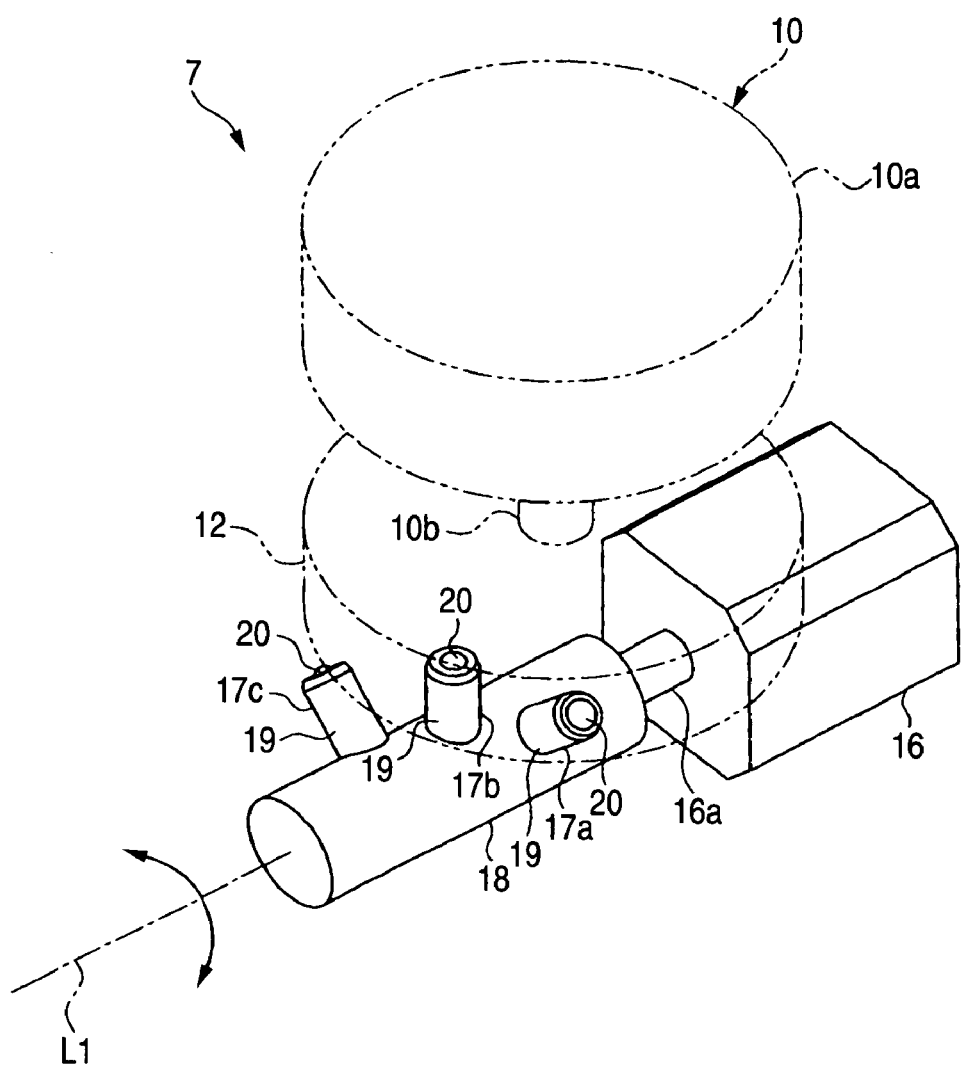
FIG. 5 is an operation explanatory view for explaining an operation of the detent changeover mechanism.

On the other hand, when the number of item buttons 5 displayed on the menu screen 29 is intermediate, the switch controller 25, for allowing the dial knob 10 to generate the intermediate click feeling, as shown in FIG. 5, rotates the motor 16 so as to allow the plunger mounting member 18 to assume the intermediate click feeling generating rotary position thus bringing the second plunger member 17b into resilient contact with the second concave/convex pattern 13b. Accordingly, among the detent mechanisms 11a to 11c, the second-stage detent mechanism 11b is allowed to function and hence, the click feeling of the second stage detent mechanism 11b which is the intermediate click feeling is generated by the dial knob 10.

Figure 6:
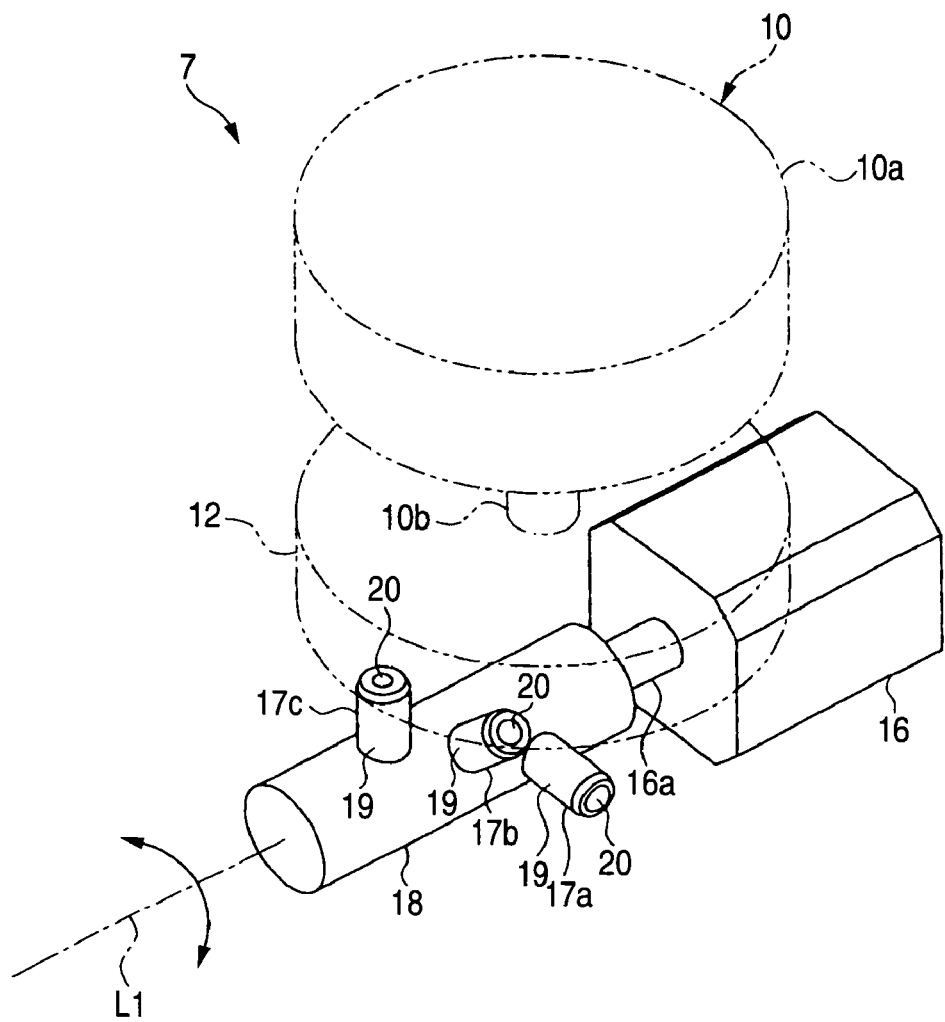
FIG. 6 is an operation explanatory view for explaining an operation of the detent changeover mechanism.

Further, when the number of item buttons 5 displayed on the menu screen 29 is large, the switch controller 25, for allowing the dial knob 10 to generate the large click feeling, as shown in FIG. 6, rotates the motor 16 so as to allow the plunger mounting member 18 to assume the large click feeling generating rotary position thus bringing the third plunger member 17c into resilient contact with the third concave/convex pattern 13c. Accordingly, among the detent mechanisms 11a to 11c, the third-stage detent mechanism 11c is allowed to function and hence, the click feeling of the third stage detent mechanism 11c which is the large click feeling is generated by the dial knob 10.

Figure 9:
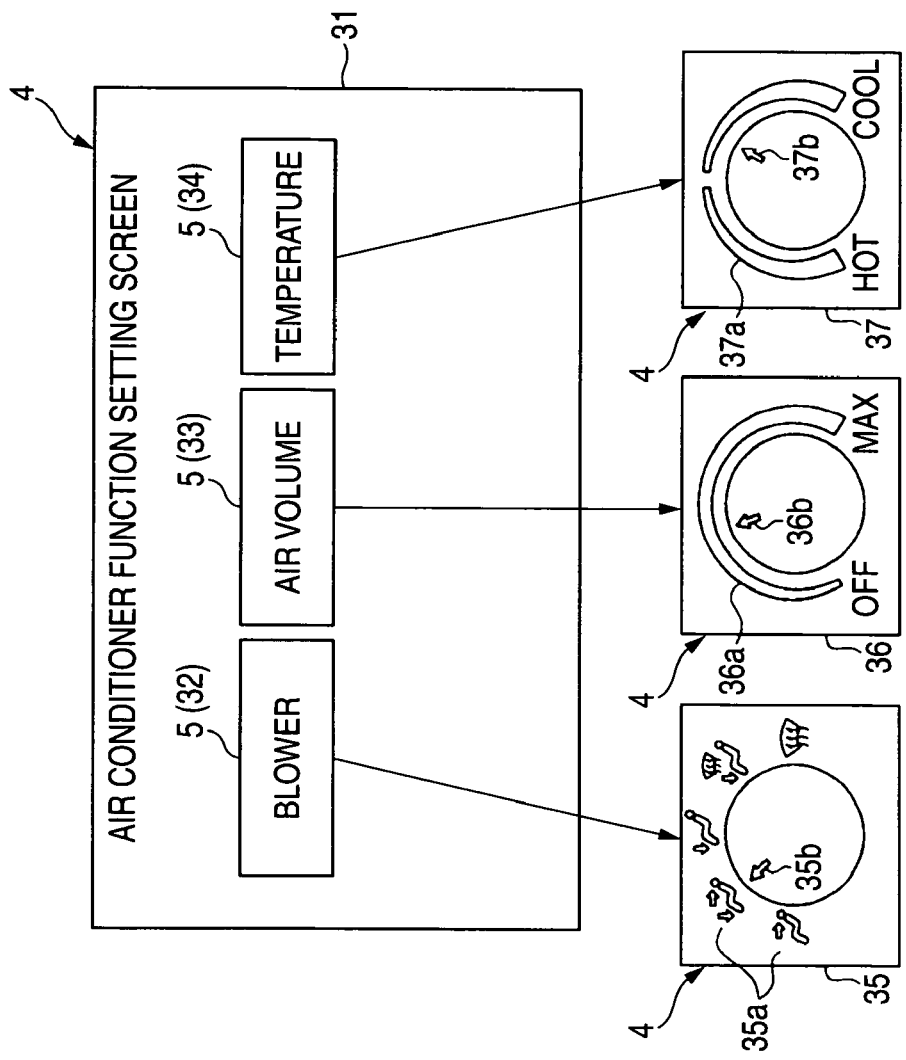
FIG. 9 is a screen view showing an air conditioner function setting screen displayed on the display.

When the selection and decision operations of the air conditioner function setting button 5a is performed on the menu screen 29, the switch controller 25 sets an operation mode thereof to an air conditioner function setting mode, and displays an air conditioner function setting screen 31 shown in FIG. 9 as a detailed function setting screen of the air conditioner on the display 4 and, at the same time, recognizes the operation switch 7 as an air conditioner function switch. On this air conditioner function setting screen 31, a blower button 32 selected at the time of changing over an air blow-off port, an air volume setting button 33 selected at the time of setting an air volume, and a supply-air temperature setting button 34 selected at the time of setting a supply-air temperature of air are allocated. Here, the selection and decision operation of these buttons 32 to 34 is performed in the same manner at the time of selecting and deciding the item buttons 5 on the menu screen 29, and the click generated by the dial knob 10 is set to any one of large, intermediate and small clicks.

When the blower button 32 is selected and designated on the air conditioner function setting screen 31, the switch controller 25 which detects the button selection and decision operation sets the operation mode thereof to a blower function setting mode, and displays the blower setting screen 35 shown in FIG. 9 on the display 4 and, at the same time, recognizes the operation switch 7 as a blower function setting switch. On the blower setting screen 35, blower function images 35a, 35a . . . corresponding to the respective blower functions are displayed as images. Here, the blower function in a selected state is notified to a user by means of a designation display which designates the blower function image 35a on the screen with an arrow 35b. Here, when the selection state of the blower function is changed over due to the rotational operation of the dial knob 10, the display position of the arrow 35b on the blower setting screen 35 is also changed over and displayed corresponding to the blower function position after the selection and the designation.

Here, with respect to this kind of blower function, the number of selection items is relatively small and hence, the switching controller 25, in displaying the blower setting screen 35 on the display 4, brings the first-stage detent mechanism 11a among the detent mechanisms 11a to 11c into a drive state and allows the dial knob 10 to generate the small click feeling. Accordingly, in changing over the blower function by rotatably operating the dial knob 10, each time the blower function is changed over to the neighboring function, operation feeling of one click is generated by the dial knob 10 and hence, the number of stages of blower selection functions of and the number of clicks of the dial knob 10 correspond to each other.

When the air volume setting button 33 is selected and designated on the air conditioner function setting screen 31, the switch controller 25 which detects the button selection and decision operation sets the operation mode thereof to an air volume setting mode, and displays an air volume setting screen 36 shown in FIG. 9 on the display 4 and, at the same time, recognizes the operation switch 7 as an air volume setting switch. On the air volume setting screen 36, an air volume image 36*a* imaging an air volume is displayed as an image. Here, the air volume in a selected state is notified to a user by means of a designation display which designates the air volume image 36*a* on the screen with an arrow 36*b* at a set air volume position. Here, when the selection state of the air volume is changed over due to the rotational operation of the dial knob 10, the display position of the arrow 36*b* on the air volume setting screen 36 is also changed over and displayed corresponding to the air volume after the selection and the designation.

Further, in this kind of air volume setting function, the number of setting operation stages is larger than the number of blower functions and hence, the switch controller 25, in displaying the air volume setting screen 36 on the display 4, brings the second-stage detent mechanism 11*b* among the detent mechanisms 11*a* to 11*c* into a drive state thus generating the intermediate click feeling of the dial knob 10. Accordingly, in changing over the air volume by rotatably operating the dial knob 10, each time the air volume is changed over by one stage due to the change over operation, the operation feeling of one click is generated by the dial knob 10 and hence, the number of air volume selection stages and the number of clicks of the dial knob 10 correspond to each other.

When the supply-air temperature setting button 34 is selected and designated on the air conditioner function setting screen 31, the switch controller 25 which detects the button selection and decision operation sets the operation mode thereof to a supply-air temperature setting mode, and displays an supply-air temperature setting screen 37 shown in FIG. 9 on the display 4 and, at the same time, recognizes the operation switch 7 as a supply-air temperature setting switch. On the supply-air temperature setting screen 37, a supply-air temperature image 37*a* imaging a supply-air temperature is displayed as an image. Here, the supply-air temperature in a selected state is notified to a user by means of a designation display which designates the supply-air temperature image 37*a* on the screen with an arrow 37*b* at the supply-air temperature setting position. Here, when the selection state of the supply-air temperature is changed over due to the rotational operation of the dial knob 10, the display position of the arrow 37*b* on the supply-air temperature setting screen 37 is also changed over and displayed corresponding to the supply-air temperature after the selection and the designation.

Further, in this kind of supply-air temperature setting function, the number of setting operation stages is set large and hence, the switch controller 25, in displaying the supply-air temperature setting screen 37 on the display 4, brings the third-stage detent mechanism 11*c* among the detent mechanisms 11*a* to 11*c* into a drive state thus generating the large click feeling of the dial knob 10. Accordingly, in changing over the supply-air temperature by rotatably operating the dial knob 10, each time the supply-air temperature is changed over by one stage due to the change over operation, the operation feeling of one click is generated by the dial knob 10 and hence, the number of supply-air temperature selection stages and the number of clicks of the dial knob 10 correspond to each other.

Accordingly, in this embodiment, the plurality of concave/convex patterns 13*a* to 13*c* which differ in the detent crest interval from each other is formed in the detent crest member 12 and hence, by rotating the plunger mounting member 18 on which the plurality of plunger members 17*a* to 17*c* is mounted, the plunger member 17 which forms a pair with one of these concave/convex patterns 13 is selectively brought into resilient contact with such one concave/convex pattern 13 thus changing over the click feeling. Accordingly, it is possible to change over the click generated by the dial knob 10 freely among the plurality of click feelings and hence, even when one dial knob 10 is used in common among the plurality of selection functions as in the case of this embodiment, by generating the click feeling which differs for respective functions, the operation switch 7 is used as the operation switches corresponding to the respective selection functions. Accordingly, this embodiment can advantageously enhance the switch operating feeling.

Further, in the detent changeover mechanism 11 of this embodiment, the plurality of concave/convex patterns 13*a* to 13*c* necessary for generating the plurality of click feelings is formed on one detent crest member 12. Accordingly, assuming that the detent crest member 12 is provided for every concave/convex pattern 13*a*, 13*b*, 13*c*, for example, each time the concave/convex pattern 13 is increased, the detent crest member 12 becomes necessary and hence, there exists a possibility that the operation switch apparatus 3 becomes large-sized. However, with the use of the detent changeover mechanism 11 of this embodiment, it is unnecessary to provide the detent crest member 12 for every concave/convex pattern 13*a*, 13*b*, 13*c* and hence, the number of parts can be reduced correspondingly thus effectively suppressing the large sizing of the operation switch apparatus 3 and a parts cost.

Figure 10:
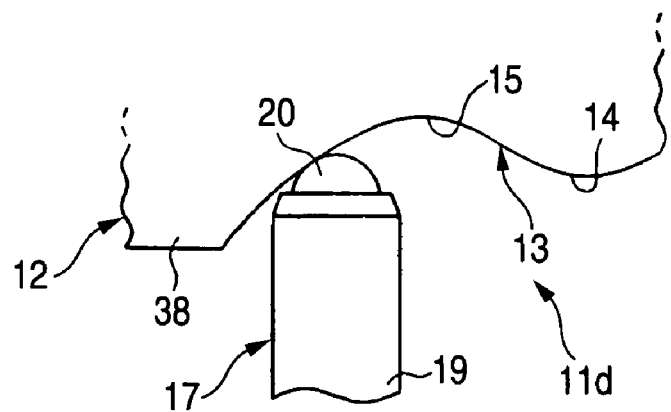
FIG. 10 is an operation explanatory view showing an operation at the time of stopping a rotary operation of a dial knob.

Further, the kind of the operation switch 7 is not limited to an endless rotary operation switch which does not limit an operation rotary range of the dial knob 10, and a rotary operation range limited switch which allows the dial knob 10 to be rotated only within a predetermined range can be also used as the operation switch 7. In this case, on one concave/convex pattern 13 among the plurality of existing concave/convex patterns 13, as shown in FIG. 10, a rotation stopping crest 38 formed in a shape higher than a shape of the detent crest 14 is formed in a projecting manner in place of the detent crest 14. Here, for the sake of convenience, a pair formed of the concave/convex pattern 13 having the rotation stopping crest 38 and the plunger 17 is referred to as the detent mechanism 11*d*.

The switching controller 25, upon detection of a fact that the rotation manipulation position of the dial knob 10 at the time of switching operation arrives at the rotation stop requesting position for restricting the rotary operation of the dial knob 10, brings the concave/convex pattern 13 having the rotation stopping crest 38 and the plunger 17 which forms the pair with the concave/convex pattern 13 into resilient contact with each other due to the rotational movement of the motor 16 thus bringing the detent mechanism 11*d* having the rotation stopping crest 38 into a drive state. Here, when the dial knob 10 is rotatably operated, the plunger casing 19 of the plunger member 17 is brought into contact with a side wall of the rotation stopping crest 38 and hence, the further knob rotary operation is restricted. When the rotational movement of the dial knob 10 is stopped in the detent mechanism 11*d*, the dial knob 10 performs a slight return rotation in the direction opposite to the preceding rotational direction due to a reaction force generated at this point of time and hence, the drive detent mechanism returns to either one of the original detent mechanism 11*a*, 11*b*, 11*c*. Accordingly, each time the rotary manipulation position reaches the rotation stop requesting position along with the knob rotary manipulation, the detent mechanism 11d functions thus restricting the further rotary operation of the dial knob 10.

Accordingly, with the use of the detent changeover mechanism 11 of this embodiment, it is possible to change over this kind of operation switch 7 from the endless rotary operation switch to the rotary-operation-range limited switch and hence, the operation switch 7 can be used as both switches consisting of the endless rotary operation switch and the rotary-operation-range limited switch. Further, by changing the arrangement position and the arrangement distance of the rotation stopping crest 38 formed on the concave-convex pattern 13, the rotation stopping position of the dial knob 10 is also changed over along with such a change of the arrangement position and the arrangement distance of the rotation stopping crest 38 and hence, the rotation stopping position of the dial knob 10 can be also freely changed by changing various conditions.

According to the arrangement of this embodiment, it is possible to acquire the following advantageous effects.

(1) The detent changeover mechanism 11 of this embodiment has an advantage that, in changing over the click feeling generated in the dial knob 10, the concave/convex patterns 13 which generate the respective click feelings can be formed on one common detent crest member 12. Accordingly, it is unnecessary to provide the detent crest members 12 for respective concave/convex patterns 13, 13 ... which generate different click feelings respectively and hence, the number of parts necessary for the detent changeover mechanism 11 can be decreased correspondingly whereby the large sizing, the increase of parts cost or the like of the operation switch apparatus 3 can be suppressed.

(2) When a linear actuator which performs the linear reciprocal movement of the drive shaft is used as the drive source of the detent changeover mechanism 11, for example, by a chance, it is necessary to prepare a space for moving the drive shaft in the inside of the switch casing 9 and hence, there arises a possibility of making the device large-sized correspondingly. However, with the use of the motor 16 which performs the rotary movement of the drive shaft as the drive source of the detent changeover mechanism 11, this kind of motor 16 is a drive part which performs the rotary movement on a site and hence, the arrangement space for the drive source can be minimized whereby the large sizing of the operation switch apparatus 3 can be also effectively suppressed from this aspect.

(3) In forming the plurality of concave/convex patterns 13, 13 ... on one detent crest member 12, by arranging the concave/convex patterns 13, 13 ... side by side along the radial direction of the detent crest member 12, the detent crest member 12 can be formed of a part having a small thickness leading to the reduction of the size of the operation switch 7 in the height direction.

(4) In this embodiment, in changing over the click feeling generated in the dial knob 10, the click feeling can be changed over with the simple control which brings the motor into three positions (small-click-feeling generating rotary position, intermediate-click-feeling generating rotary position, large-click-feeling generating rotary position).

(5) The operation switch apparatus 3 of this embodiment uses the GUI which displays various item buttons 5 on the display 4, and performs the button selection and decision operation by selectively operating the item buttons 5 using the dial knob 10. Accordingly, even when the operation switch apparatus 3 adopts the structure which uses one dial knob 10 in common among the plurality of switch selection functions, an operator is informed of an operation quantity range of the dial knob 10 corresponding to the selection function in an operation state at a point of time, and kinds of item buttons 5 which can be selected. Accordingly, the operator can recognize the operation position at which the operation switch 7 is to be operated at the time of operating the operation switch 7 thus ensuring the high operability of the operation switch 7.

Second Embodiment

Figure 11:
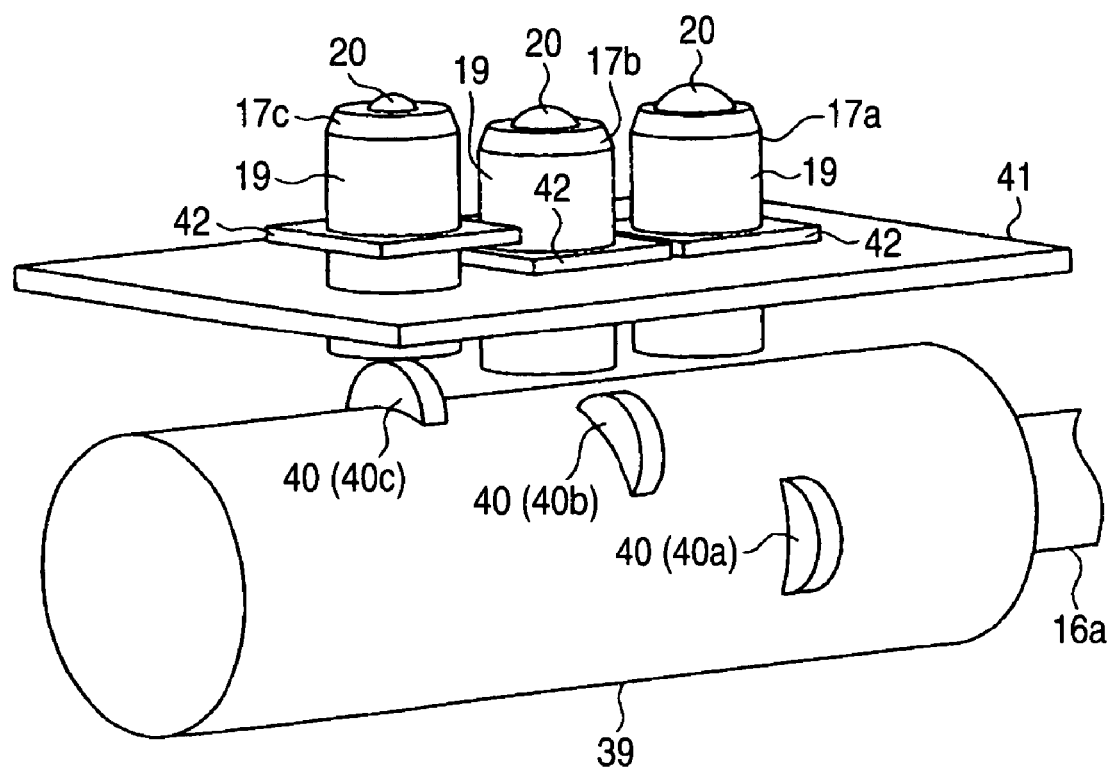
FIG. 11 is a perspective view showing the schematic arrangement of a detent changeover mechanism according to a second embodiment.
Figure 12:
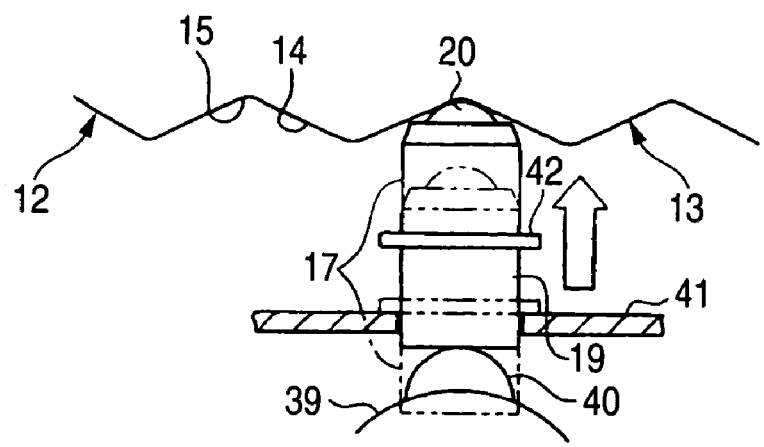
FIG. 12 is an operation explanatory view showing an operation when the plunger member is moved vertically by a pushing portion.

Next, the second embodiment is explained in conjunction with FIG. 11 and FIG. 12. Here, the second embodiment is substantially equal to the first embodiment except for that only the structure of the detent changeover mechanism 11 of the second embodiment differs from the detent changeover mechanism 11 of the first embodiment. Accordingly, parts identical with the parts of the first embodiment are given same symbols, and their detailed explanation is omitted, and only parts which differ from the parts of the first embodiment are explained.

As shown in FIG. 11, to a distal end of a drive shaft 16a of a motor 16, a columnar plunger selection portion 39 is fixedly secured in a state that the plunger selection portion 39 is integrally rotatably with the motor 16 coaxially with the drive shaft 16a. Pushing portions 40 having an arcuate cross-sectional shape are formed on an outer peripheral surface of the plunger selection portion 39, wherein the number of pushing portions 40 is equal to the number (three in this embodiment) of plunger members 17. These pushing portions 40, 40 ... are displaced from each other along the direction of an axis L1 of the plunger selection portion 39 and, at the same time, are displaced also around the axis L1. The pushing portions 40, 40 ... are named as a first pushing portion 40a, a second pushing portion 40b and a third pushing portion 40c in order from the pushing portion positioned closest to the motor.

In the inside of a switch casing 9, a plunger platform 41 having a planar shape is fixedly mounted in a state that the plunger platform 41 is positioned in the vicinity of the plunger selection portion 39. On the plunger platform 41, plunger members 17a to 17c having the substantially equal structure as the plunger members described in the first embodiment are mounted in a state that the plunger members 17a to 17c are relatively movable along the direction approximately orthogonal to the plunger platform 41. A tongue-shaped stopper member 42 which prevents downward falling of the plunger member 17 is formed on an outer periphery of each plunger member 17 in a projecting manner.

These plunger members 17a to 17c are configured to assume, when the plunger selection portion 39 is rotated due to the rotation of the motor 16, as shown in FIG. 12, states (states indicated by a solid line in FIG. 12) in which one of the plunger members 17a to 17c takes a projecting position for selectively lifting such plunger member due to the pushing portion 40a, 40b, 40c corresponding to the plunger. The lifted plunger member 17 is brought into resilient contact with a concave/convex pattern 13, and one of detent mechanisms 11a to 11c is selectively brought into a drive state. Further, the plunger member 17 which assumes the pushed state due to the pushing portion 40, when the pushed state due to the pushing portion 40 is removed by the change of the rotary position of the motor 16, moves downwardly due to a dead weight thereof and returns to an original stored position (a state indicated by a chained line in FIG. 12).

In the switch controller 25, when it is necessary to generate the small click feeling in the dial knob 10, the plunger selection portion 39 is rotated using the motor 16 as a drive source so that the first plunger member 17a is pushed by the first pushing portion 40. Here, among three plunger members 17a to 17c, the first plunger member 17a assumes the projecting position thus bringing a state in which the first plunger member 17a is brought into resilient contact with the first concave/convex pattern 13a and hence, the first-stage detent mechanism 11a assumes a drive state. Accordingly, when the dial knob 10 is rotatably operated, the small click feeling which is the generation click of the first-stage detent mechanism 11a is generated in the dial knob 10.

On the other hand, in the switch controller 25, when it is necessary to generate the intermediate click feeling in the dial knob 10, the plunger selection portion 39 is rotated using the motor 16 as a drive source so that the second plunger member 17b is pushed by the second pushing portion 40b. Here, among three plunger members 17a to 17c, the second plunger member 17b assumes the projecting position thus bringing a state in which the second plunger member 17b is brought into resilient contact with the second concave/convex pattern 13b and hence, the second-stage detent mechanism 11b assumes a drive state. Accordingly, when the dial knob 10 is rotatably operated, the intermediate click feeling which is the generation click of the second-stage detent mechanism 11b is generated in the dial knob 10.

Further, in the switch controller 25, when it is necessary to generate the large click feeling in the dial knob 10, the plunger selection portion 39 is rotated using the motor 16 as a drive source so that the third plunger member 17c is pushed by the third pushing portion 40c. Here, among three plunger members 17a to 17c, the third plunger member 17c assumes the projecting position thus bringing a state in which the third plunger member 17c is brought into resilient contact with the third concave/convex pattern 13c and hence, the third-stage detent mechanism 11c assumes a drive state. Accordingly, when the dial knob 10 is rotatably operated, the large click feeling which is the generation click of the third-stage detent mechanism 11c is generated in the dial knob 10.

According to the arrangement of this embodiment, in addition to the advantageous effects (1) to (5) of the first embodiment, this embodiment can acquire the following advantageous effects.

(6) The drive parts constituted of the motor 16 and the plunger selection portion 39 form a group of parts which is a unit independent from the plunger members 17, 17 . . . and hence, even when shapes of the plunger members 17, 17 . . . are changed, for example, it is possible to use the same drive parts among these plunger members 17, 17 . . . having different shapes. Accordingly, it is unnecessary to prepare the dedicated detent changeover mechanism 11 for respective groups of plunger parts different from each other thus reducing a cost of parts necessary for the detent changeover mechanism 11.

The embodiment is not limited to the above-mentioned arrangements, and may be modified as follows.

Figure 13:
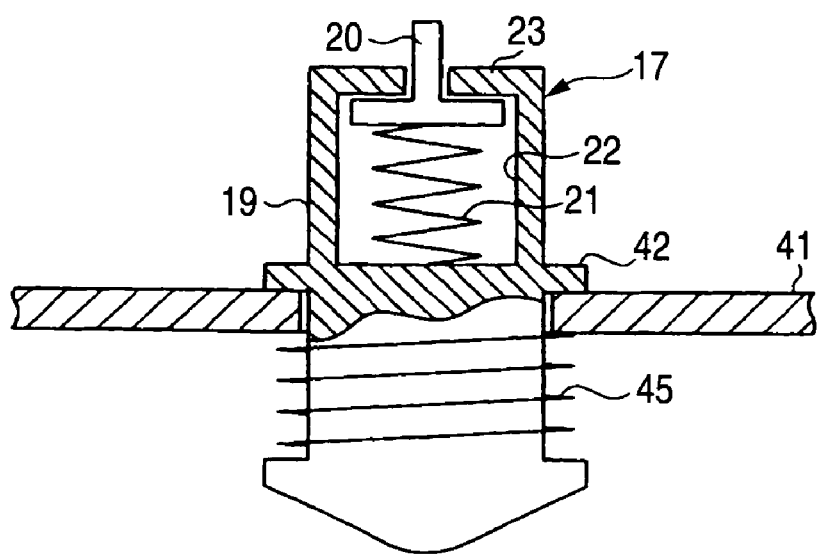
FIG. 13 is a cross-sectional view with a part broken away showing the specific structure of a plunger member in another embodiment.

In the second embodiment, the plunger member 17 which is lifted to the projecting position by the pushing portion 40 is not always limited to the structure which returns the plunger member 17 to the original stored position due to the dead weight thereof. For example, as shown in FIG. 13, the detent changeover mechanism 11 may be configured such that a biasing member 45 which biases the plunger member 17 toward a stored position side is interposed between the plunger member 17 and the plunger platform 41 so as to return the plunger member 17 to the stored position from the projecting position by making use of a biasing force of the biasing member 45. In this case, it is possible to more surely return the plunger member 17 positioned at the projecting position to the stored position.

In the second embodiment, a shape of the detent piece 20 is not always limited to a spherical shape. For example, as shown in FIG. 13, the detent piece 20 may be formed in an inverse T-shape for preventing the removal of the detent piece 20 from the plunger casing 19.

Figure 14A:
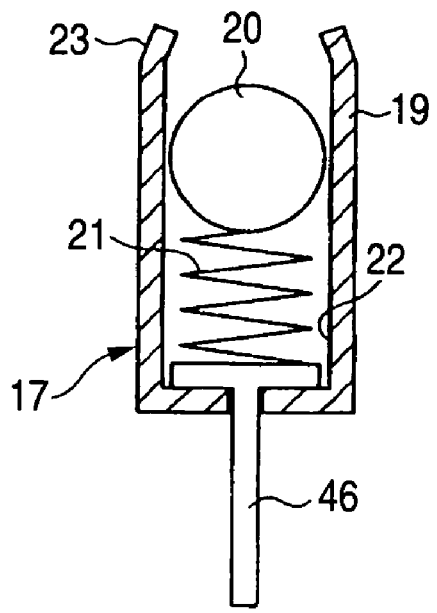
FIG. 14A and FIG. 14B are cross-sectional views showing the specific structure of the plunger member in another embodiment.
Figure 14B:
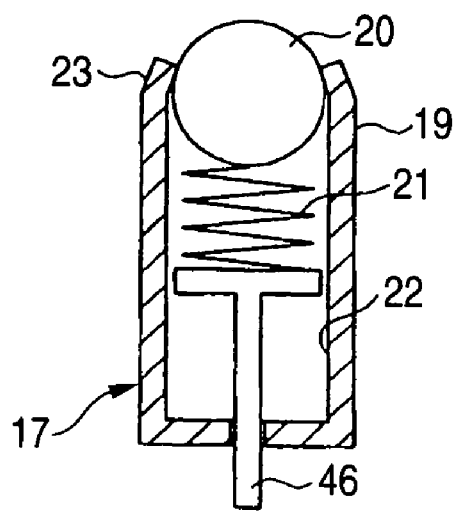

In the second embodiment, the changeover of the presence/non-presence of the resilient contact of the detent piece 20 is not limited to the structure which lifts or lowers the whole plunger member 17. For example, as shown in FIGS. 14A and 14B, the second embodiment may adopt the structure in which the detent piece 20 and the biasing member 21 in the inside of the plunger casing 19 are vertically movable so as to lift the movable member 46 for supporting the biasing member 21 with the pushing portion 40 thus bringing the detent piece 20 into resilient contact with the concave/convex pattern 13.

Figure 15:
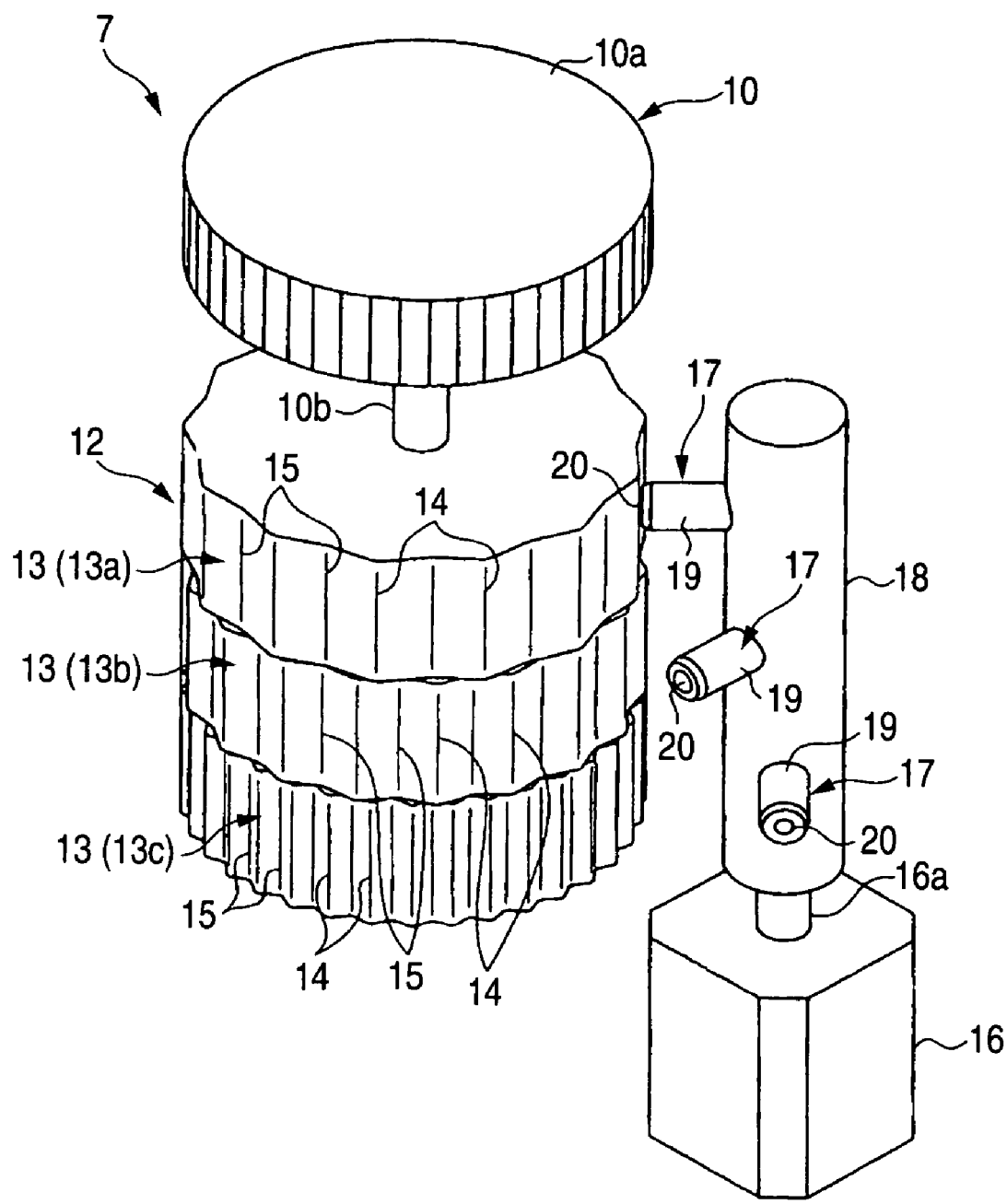
FIG. 15 is a perspective view showing the schematic arrangement of a detent changeover mechanism of another embodiment.

In the first and second embodiments, the plurality of concave/convex patterns 13 formed on one detent crest member 12 is not limited to the structure in which the concave/convex patterns 13 are arranged side by side in the radial direction of the detent crest member 12. As shown in FIG. 15, the plurality of these concave/convex patterns 13, 13 . . . may be arranged side by side along the thickness direction of the detent crest member 12, for example. In this case, the size of the detent crest member 12 in the radial direction can be reduced leading to the miniaturization of the size of the operation switch apparatus 3 in the radial direction.

In the first and second embodiments, the operation switch 7 is not limited to the rotary operation switch which operates the dial knob 10 constituting the operation portion of the operation switch 7 in the rotary direction, and may be a slide operation switch which operates the operation portion in the lateral direction, for example.

In the first and second embodiments, the item values on the click feeling such as the shapes and the distances of the detent crests 14 of the respective detent mechanisms 11a to 11c, the size of the detent piece 20 and the biasing force of the biasing member 21 can be suitably and freely set and changed.

In the first and second embodiments, in using the rotary operation limit switch as the operation switch 7, one detent crest 14 in one predetermined concave/convex pattern 13 may be set to a rotary stop crest 38 thus satisfying the function of the operation switch 7.

In the first and second embodiments, the changeover of the click feeling of the operation switch 7 may be performed based on the panel touch operation when the display 4 is of a touch panel type, for example, and may be performed based on the rotation operation quantity since the rotation operation quantity of the dial knob 10 is observed using the encoder 24.

In the first and second embodiments, the operation switch 7 is not limited to the structure in which the detent crest member 12 is mounted on the dial knob 10 side and the plunger member 17 is mounted on the switch casing 9 side and this combination may be reversed.

In the first and second embodiments, the arrangement position of the plunger member 17 is not always limited to the position below the detent crest member 12. That is, provided that the concave/convex patterns 13 of the detent crest member 12 are formed on the upper surface of the plate member, the plunger member 17 may be arranged above the detent crest member 12.

In the first and second embodiments, the actuator of the detent changeover mechanism 11 is not always limited to the motor 16 and may be other drive source such as a solenoid, for example.

In the first and second embodiments, the number of detent mechanisms is not limited to three and may be two, four or more.

In the first and second embodiments, the operation switch apparatus 3 of this embodiment is not always limited to the switch apparatus mounted on the vehicle and an object on which the operation switch apparatus 3 can be mounted is not limited provided that the operation switch apparatus 3 is a switch apparatus having an operation system such as an electric appliance, for example.

Next, the technical concepts which are grasped from the above-mentioned embodiments and other embodiments are described hereinafter together with their advantageous effects.

(1) In any one of claims 1 to 3, the detent changeover mechanism is, when the specific plunger member out of the plurality of plunger members is brought into resilient contact with the concave/convex pattern corresponding to the plunger member, is operated by the rotary actuator whose drive shaft is rotatably driven. In this case, the operation switch apparatus 3 can acquire the manner of operation and advantageous effects similar to the manner of operation and the advantageous effects of the operation switch apparatus 3 in claim 2.

(2) In any one of claims 1 to 3, the operation portion is of a rotary operation type whose operation direction agrees with the rotary direction thereof. In this case, in the rotary-operation-type operation switch apparatus, the click of the operation portion can be changed over in multiple stages.

(3) In any one of claims 1 to 3 and the above-mentioned technical concepts (1), (2), the detent changeover mechanism includes a rotary actuator having a drive shaft thereof rotatably driven and working as the drive source for bringing one of the plurality of plunger members and the concave/convex pattern which forms the pair with one plunger member into the resilient contact state with each other, a holding member holding the plurality of plunger members in a state that the plurality of plunger members are movable between two positions consisting of a projection position where the plunger members project toward the concave/convex pattern side and a stored position where the plungers members are retracted toward a side opposite to the projection position, a changeover means which is mounted on the drive shaft of the rotary actuator, pushes one of the plurality of plunger members from a back of the plunger member at the time of driving the rotary actuator to arrange the plunger member at the projection position thus bringing the plunger member into resilient contact with the concave-convex pattern, and a control means for operating the changeover means with a drive control of the rotary actuator so as to bring the specific plunger member out of the plurality of plunger members and the concave/convex pattern which forms the pair with the specific plunger member into resilient contact with each other thus selectively bringing the specific detent mechanism out of the plurality of detent mechanisms into an operation state so as to change over operation feeling of the operation portion. In this case, it is unnecessary to directly mount the plunger members on the drive shaft of the rotary actuator and hence, even when the plural kinds of plunger members are used, the same rotary actuator part can be used whereby the number of parts necessary for the detent changeover switch apparatus can be effectively reduced.

(4) In any one of claims 1 to 3 and the above-mentioned technical concepts (1) to (3), the operation portion is of a rotary operation type in which the operation direction assumes the rotary direction, the plurality of concave/convex patterns which differ in acquirable click feeling from each other are formed on a side surface of the detent crest member in a state that the plurality of concave/convex patterns is arranged side by side along the axial direction of the rotatable detent crest member rotatably operated upon an operation of the operation portion, and the rotary actuator is arranged in which the drive shaft is arranged in parallel to the operation shaft of the operation portion, and the plunger member is selectively brought into resilient contact with the concave/convex pattern from a side surface side. In this case, it is possible to reduce a size in the radial direction of the detent changeover switch apparatus with the operation portion of a rotary operation type.

What is claimed is:

1. A detent changeover switch apparatus for performing a selection function operation, comprising:
   an operation switch that includes an operation portion to be operated by an operator and a support portion;
   a plurality of detent mechanisms, wherein each of the detent mechanisms includes a detent crest member that has a concave/convex pattern along an operating direction of the operation portion and is formed on one of the operation portion and the support portion, and a plunger member that includes a biasing member and a piece member resiliently brought into contact with the concave/convex pattern by the biasing member and is formed on the other of the operation portion and the support portion; and
   a detent changeover mechanism that includes an actuator for bringing the piece member of the plunger member of one of the detent mechanisms into resilient contact with the corresponding concave/convex pattern to allow the operation portion to generate click feeling when the piece member gets over a projection portion of the concave/convex pattern at the time of operating the operation portion,
   whereby the detent changeover mechanism changes over click feeling of the operation portion by selecting one of the detent mechanisms and bringing the selected detent mechanism into an operation state.

2. The detent changeover switch apparatus according to claim 1, wherein the detent changeover mechanism includes:
   the actuator that is a rotary actuator and includes a drive shaft;
   a support member that is mounted on the drive shaft and mounts the plunger members of the detent mechanisms in a state that the plunger members are arranged in an axial direction of the drive shaft and are displaced in a circumferential direction of the drive shaft, wherein the support portion includes the support member;
   a detector that detects an operation state when the operator operates the operation portion, and
   a controller that performs a drive control of the rotary actuator based on a detection quantity of the detector to bring the plunger member of the selected detent mechanism into resilient contact with the corresponding concave/convex pattern.

3. The detent changeover switch apparatus according to claim 2, wherein
   the operation portion is of a rotary operation type in which the operation direction assumes a rotary direction,
   among the detent mechanisms, the concave/convex patterns generate click feelings different from each other, respectively,
   the concave/convex patterns are formed on a bottom surface of the detent crest member so that the concave/convex patterns are arranged side by side along a radial direction of the detent crest member, and
   the rotary actuator is arranged in an orthogonal direction in which the drive shaft intersects an operation shaft of the operation portion, and the plunger members are selectively brought into resilient contact with the corresponding concave/convex pattern from a bottom surface side.

* * * * *